June 28, 1955  S. V. HETTINGER, JR  2,711,749
COMPOUND CENTRIFUGAL GOVERNOR
Original Filed Feb. 4, 1952
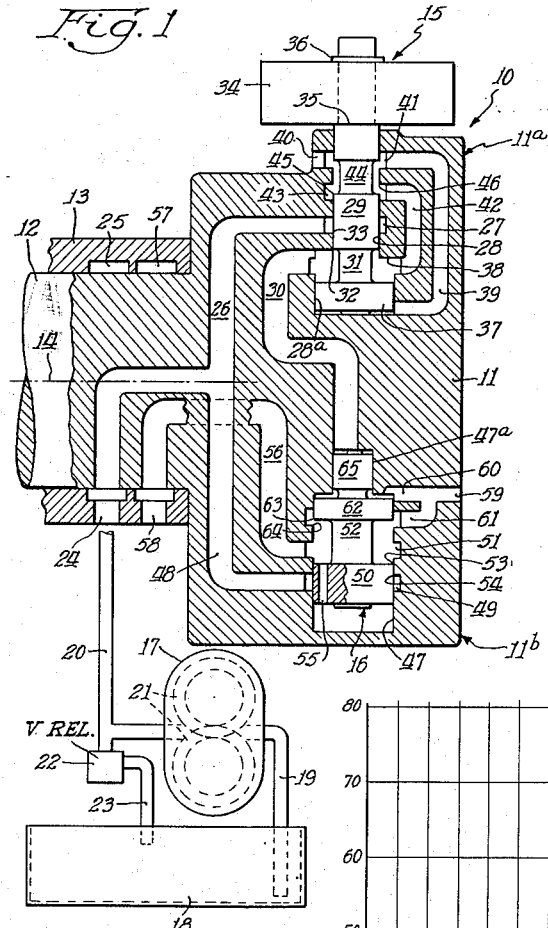
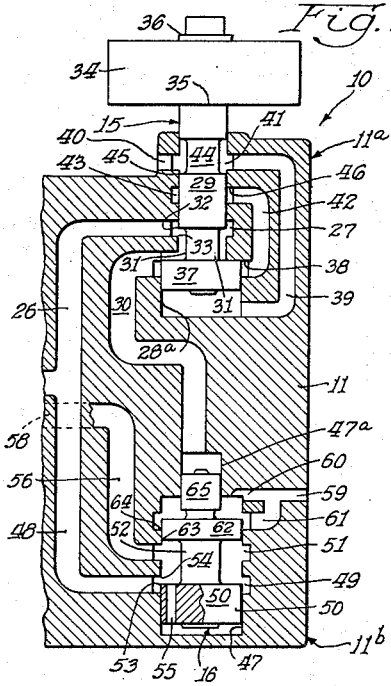
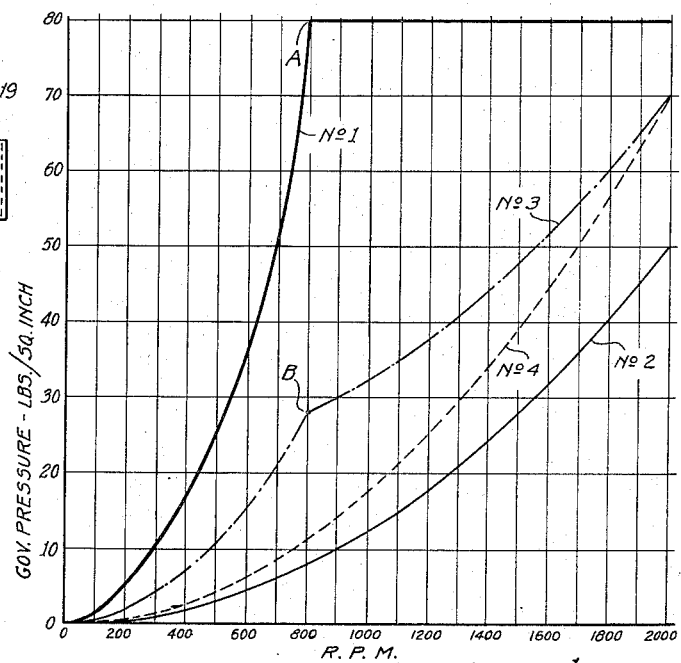
Inventor:
Sidney V. Hettinger, Jr.
By: Keith J. Blean
Atty.

United States Patent Office 2,711,749
Patented June 28, 1955

2,711,749

COMPOUND CENTRIFUGAL GOVERNOR

Sidney V. Hettinger, Jr., Broadview, Ill., assignor to Borg-Warner Corporation, Chicago, Ill., a corporation of Illinois Continuation of application Serial No. 269,828, February 4, 1952. This application July 23, 1953, Serial No. 369,788

15 Claims. (Cl. 137—56)

This invention relates to a centrifugal type governor for controlling pressure in a fluid. More particularly, the invention relates to a centrifugal type fluid pressure controlling governor with a wide useful range of output pressure wherein there are substantial increments of pressure change with corresponding increments of rotational speed change.

This application is a continuation of my co-pending application Serial No. 269,828, filed February 4, 1952 (now abandoned), for hydraulic governor.

In many automatic transmissions changing between the various speed ratios is accomplished by utilizing fluid pressure which is varied in accordance with the speed of rotation of an element of the transmission. Commonly the correlation between the speed of rotation and the variable fluid pressure is achieved through the use of a centrifugal governor wherein substantially constant input or line fluid pressure provided by a pump is metered through a valve which is urged outwardly by centrifugal force. The metered fluid pressure is imposed upon a portion of the valve to oppose the centrifugal force on the valve. Thereby the outlet pressure of the governor represents the fluid pressure necessary to oppose and balance the centrifugal force upon the valve, and, therefore, in such valves the governor outlet pressure varies directly with the centrifugal force on the valve.

However, centrifugal force imposed on an element mounted eccentrically of a rotated shaft varies as the square of the speed of rotation. Thus, the outlet pressure of the ordinary centrifugal governor varies directly as the square of the speed of rotation of the governor valve body. As a result, a governor which is arranged to provide a substantial, usable rate of increase of pressure with increase in rotational speed for a relatively slow speed range of rotation is not usable for controlling ratio changing at higher speeds because the outlet pressure of the governor reaches the line fluid pressure before the entire shift speed range has been traversed. Conversely, a governor arranged to provide a substantial, usable rate of increase of fluid pressure with increase in rotational speed in the high speed range is not usable in the low speed range because of the very low rate of change of fluid pressure in this range.

The present invention provides a single centrifugal governor with a very much increased range by providing two centrifugally operated valves, one of which provides a substantial increase in fluid pressure in the low speed range and the other of which provides a substantial increase in fluid pressure over the high speed range. The outlet pressure of the low speed valve is not utilized as a ratio changing control pressure in the transmission but, instead, is impressed upon a portion of the high speed valve to bias the same in the direction of movement due to centrifugal force. Thus, the outlet pressure of the high speed valve, which is utilized for transmission ratio change control, is affected by centrifugal force acting on both of the valves. During the low speed range the governor outlet pressure is influenced more by the low speed valve than the high speed valve because of the greater increase in centrifugal force on the low speed valve which is communicated to the high speed valve through the low speed outlet pressure. During the high speed range, the low speed valve is fully opened and the substantially constant line pressure is imposed upon the high speed valve through the low speed outlet, but in this range the increase in centrifugal force upon the high speed valve becomes substantial so that the governor outlet pressure continues to increase at a substantial rate in response to increased rotational speed.

It is, therefore, an object of the present invention to provide an improved centrifugal type fluid pressure governor with an extended range.

Another object of the invention is to provide a fluid pressure governor for achieving a substantial rate of increase of fluid pressure in response to increase in governor rotational speed over a range of rotational speed which is greatly increased over the ranges of ordinary centrifugal type fluid pressure governors.

A further object of the invention is to provide an improved fluid pressure governor with extended range with a low speed element influencing the operation of a high speed element to provide a composite governor outlet pressure.

Still another object of the present invention is to provide improved mechanism for correlating the rate of change of fluid pressure with the rate of change of speed of rotation of an element by utilizing two or more centrifugal type valves arranged in series whereby the valve most sensitive to centrifugal force imposes its outlet pressure upon the next most sensitive valve and so on, so that the outlet pressure of the most insensitive valve increases at a roughly constant rate over a range greatly increased from that obtainable with a single valve.

Other objects, features and advantages of the invention will be apparent from the following detailed description of one embodiment, by way of preferred example only, taken in conjunction with the accompanying drawings, in which:

Fig. 1 is a schematic view, partly in section, of a centrifugal type fluid pressure governor according to the present invention with the valves shown in closed position;

Fig. 2 is a schematic view similar to Fig. 1 but showing the valves in positions attained in the high speed range; and Fig. 3 is a graphic illustration of the variation of output pressure with rotational speed of the governor of Fig. 1 together with illustrations of the output pressure variations of an ordinary type governor and of the low and high speed centrifugal valves of the present invention individually.

In Figs. 1 and 2 the centrifugal type fluid pressure governor of the present invention is generally designated by the reference numeral 10. The governor 10 comprises a body or member 11 including a portion 11a and another portion 11b affixed to a rotatable shaft 12 journalled in a bearing block or sleeve 13 and rotatable about an axis 14. The shaft 12 may be driven by any rotatable portion of a transmission or the like (not shown) with which the fluid outlet pressure from the governor is to be correlated. The governor 10 includes a low speed range centrifugal valve 15 disposed in the body portion 11a and a high speed range centrifugal valve 16 disposed in the body portion 11b, constructed and arranged in a manner to be described.

For supplying fluid, such as hydraulic or lubricating oil, under pressure to the governor 10 a fluid pump 17 is provided for drawing fluid from a reservoir or sump 18 through a conduit 19 leading from the sump to the pump. The pressurized fluid is then conducted from the pump through a conduit 20 leading to the governor. The pump 17 may be driven by any rotatable portion of a transmission (not shown) and may be of the gear type comprising a pair of rotatable gears 21. In order to maintain a substantially constant maximum pressure in the supply pressure conduit 20, a pressure relief valve 22 is fluid connected to the conduit and has a discharge duct 23 leading back to the sump 18. The valve 22 may be of any suitable type which remains sealed until a predetermined pressure is obtained and then unseats to bleed the pressure line whenever the pressure therein tends to exceed the predetermined maximum pressure.

The pressure supply conduit 20 directs fluid to an inlet port 24 formed in the sleeve 14. The port 24 communicates with an annular inner supply groove 25 which supplies fluid to an inlet passage 26 formed through the shaft 12 and the governor body member 11. The supply passage 26 communicates with an annular supply groove 27 formed in the wall of a valve bore 28. The bore 28 is formed perpendicular to the axis 14 and has the low speed range centrifugal valve 15 slidably disposed therein. When the valve 15 is in the closed position as shown in Fig. 1 the inlet groove 27 is closed by means of a land 29 formed on the valve and in close fitting relation with the wall of the bore 28, but when the valve 15 is moved radially outwardly as shown in Fig. 2 the inlet groove 27 communicates with a discharge passage 30 by means of an annular groove 31 formed in the valve 15 axially inwardly of the land 29 as seen in the figures. An annular shoulder 32 formed at the junction of the land 29 and the groove 31 and an annular shoulder 33 formed at the axially inward junction of the bore 28 and the groove 27 provide metering means for metering fluid from the supply passage 26 to the outlet passage 30 during normal operation of the governor to be described.

In order to bias the valve 15 outwardly in response to rotation of the shaft 12 and the member 11 a weight 34 is secured to the valve outwardly of the body member 11 by means of a shoulder 35 formed on the valve and a snap ring 36. As will be seen, centrifugal force will urge the valve outwardly both because of the eccentrically disposed weight of the valve itself and because of the eccentrically disposed weight of the associated element 34. As is well known, the centrifugal force on the valve 15 will vary as the product of its mass times the radius from its center of mass to the axis 14 for any given angular velocity. For convenience this parameter will hereafter be referred to as the mass-radius product.

For opposing the centrifugal force on the valve 15 an enlarged diameter portion 37 is formed on the axially inward end of the valve below the groove 31, so that when centrifugal force moves the valve outwardly the pressure of the fluid metered past the shoulders 32 and 33 will bear against the outwardly disposed face of the enlarged portion 37 to oppose the centrifugal force acting on the valve. The enlarged portion 37 is disposed in peripheral conforming relation in an enlarged diameter portion 28a of the bore 28. The position of the valve 15 will be determined by the magnitude of the opposing centrifugal and pressure forces so that the pressure against the enlarged portion 37 and hence the pressure within the discharge passage 30 will vary directly with the centrifugal force acting on the valve 15. Since the centrifugal force on the valve 15 varies directly as the square of the speed of rotation of the shaft 12, the pressure within the discharge passage 30 will vary accordingly.

Because of the relatively heavy mass of the weight 34, at a certain speed of rotation of the shaft 12 the maximum or line pressure of the fluid supplied by the pump 17 will be necessary to oppose the centrifugal force on the valve 15. Since no greater fluid pressure is available, a stop shoulder 38 is provided in the body member 11 to abut the enlarged portion 37 of the valve 15 to prevent further outward movement of the valve. When this position of the valve is reached, as shown in Fig. 2, it will be readily understood that the pressure within the discharge passage 30 is equal to the line pressure delivered by the pump 17.

Means are provided for relieving the pressure in the bore 28a upon sudden deceleration and for exhausting fluid which leaks past the land 29 and the enlarged portion 37. Herein such means comprise an exhaust passage 39 leading from the inward end of the enlarged portion 28a of the bore 28 to an exhaust port 40, vented to atmospheric pressure, through an annular groove 41. Also provided is an exhaust passage 42 communicating between the upper end portion of the bore 28a to an annular groove 43 formed in the bore 28 between the grooves 27 and 41. The valve 15 is provided with an annular groove 44 above the land 29 and providing communication between the grooves 41 and 43 when the valve 15 is in the closed position as seen in Fig. 1. However, just prior to the point where the inlet groove 27 comes into communication with the valve groove 31, the land 29 cuts off communication between the grooves 41 and 43 to prevent venting of the axially outward portion of the bore 28a to the exhaust port. In normal operation, leakage in the system is sufficient to cause the required decrease in pressure in the bore 28a upon slight deceleration of the shaft 12 resulting in a decreased centrifugal force on the valve 15.

An annular shoulder 45 formed at the junction of the land 29 and the groove 44 and an annular shoulder 46 formed at the axially outward junction of the bore 28 and the groove 43 provide metering means for metering fluid from the exhaust passage 42 to the exhaust port 40 upon sudden deceleration of the shaft 12. When sudden deceleration occurs, the pressure in the enlarged bore 28a greatly exceeds that required to balance the centrifugal force so that the valve 15 moves inwardly rapidly to block the groove 27 and to open the groove 43 to the exhaust port 40. Therefore, the excess pressure within the bore 28a is quickly metered to atmospheric pressure past the shoulders 45 and 46.

It will be seen that when the speed of rotation of the shaft 12 is sufficient to cause the valve 15 to move to its outward limit position, the outlet pressure from this valve could no longer serve as a control pressure for the transmission since it is maintained substantially constant. Therefore, the high speed range centrifugal valve 16 is provided and is disposed in a valve bore 47 formed in the portion 11b of the body member 11 in axial alignment with the bore 28. The center of gravity of the valve 16 is eccentrically located with respect to the axis 14. Pump pressure is communicated to the bore 47 by means of an inlet passage 48 which connects between the inlet passage 26 and an annular inlet supply groove 49 formed in the wall of the bore 47. When the valve 16 is in its closed position as seen in Fig. 1, communication between the inlet groove 49 and the bore 47 is cut off by a land 50 formed at the axially outward end portion of the valve. However, when the valve 16 is biased outwardly by centrifugal force due to rotation of the shaft 12, the inlet groove 49 communicates with an annular outlet groove 51, formed in the wall of the bore 46, by means of an annular groove 52 formed in the valve 16 axially inwardly of the land 50 as seen in the figures. An annular shoulder 53 formed at the junction of the land 50 and the groove 52 and an annular shoulder 54 formed at the axially inward junction of the bore 47 and the groove 49 provide metering shoulders corresponding to the shoulders 32 and 33, respectively, of the valve 15.

In order to provide a pressure force opposing the centrifugal force on the valve 16, a passage 55 is formed through the land 50 and communicates between the groove 52 and a portion of the bore 47 below the land 50. Thus, when fluid pressure is communicated to the groove 52, this pressure is also communicated through the passage 55 to the chamber below the land 50 to provide an opposing pressure bias to the centrifugal force on the valve 16. As is the case with the valve 15, in the absence of other biasing forces, the position of the valve 16 will be in accordance with a balance of the centrifugal and pressure forces so that the pressure in the valve groove 52 and hence the outlet groove 51 will vary directly as the square of the speed of rotation of the shaft 12. However, it is readily apparent that the centrifugal force on the valve 16 will be considerably smaller than that on the valve 15 for the same rotational speed of the shaft 12 since the mass of the valve 16 is considerably smaller and the distance from the axis 14 to the center of mass of the valve 15 is at least as great as the distance from the axis 14 to the center of mass of the valve 16.

The outlet pressure from the valve 16 and from the governor 10 is communicated from the groove 51 through an outlet passage 56 to an annular collector groove 57 formed in the inner surface of the sleeve 14. From here the outlet pressure is conducted out an outlet port 58 for conducting to the servo mechanisms of the transmission control (not shown).

In order to provide means for relieving the pressure in the groove 52 upon sudden deceleration and to exhaust fluid leaks, an exhaust port 59 is formed in the body member 11 and communicates through exhaust passages 60 and 61 with portions of the bore 47 above and below a land 62 formed on the valve 16 axially inwardly of the groove 52 as seen in Fig. 1. As can be seen, when the groove 49 is closed by the land 50, the exhaust passage 61 communicates with groove 52 and the portion of the bore 47 below the land 50 through the passage 55. However, as the inlet groove 49 is opened, the exhaust passage 61 is cut off by the land 62. An annular shoulder 63 formed at the junction of the land 62 and the groove 52 and an annular shoulder 64 formed at the axially outward junction of the bore 47 and the groove connecting with the passage 61 provide metering shoulders corresponding to the shoulders 45 and 46, respectively, of the valve 15.

Not considering the influence of the outlet pressure from the valve 15, the valve 16 operates similarly to valve 15. Fluid is metered between the shoulders 53 and 54 during normal operation to provide a pressure force acting in the groove 52 and in the bore 47 outwardly of the land 50 to balance the centrifugal force on the valve. During sudden deceleration, fluid is metered between the shoulders 63 and 64 to quickly relieve the biasing pressure.

According to the present invention means are provided for influencing the operation of the valve 16 in accordance with the outlet pressure from the valve 15 in order to substantially increase the useful range of operation of the governor 10. Herein such means comprise the discharge passage 30 of the valve 15 which communicates with the inward end of a reduced diameter portion 47a of the bore 47 in which a reduced diameter inward piston portion 65 of the valve 16 is slidably disposed. It will be seen that the pressure in the discharge passage 30 is communicated against the end of the piston portion 65 to add to the bias on the piston 16 caused by centrifugal force to increase the governor outlet pressure from the valve 16 during the low range of operation. However, when the rotational speed of the shaft 12 is sufficient to urge the valve 15 against the stop 38, the pressure within the discharge passage 30 remains substantially constant so that the additional bias imposed on the valve 16 by this pressure also remains substantially constant.

The operation of the governor may be briefly summarized as follows. Pressure from the pump 17, which is maintained substantially constant by the pressure relief valve 22, is metered between the shoulders 32 and 33 by means of the centrifugal valve 15 to a discharge passage 30 in accordance with a balance of the centrifugal and pressure forces exerted on the valve so that the pressure within the discharge passage 30 varies directly as the square of the speed of rotation of the shaft 12. This pressure is communicated to the valve 16 which is also acted on by centrifugal force, but this centrifugal force is of a considerably smaller magnitude. The pump pressure is metered between the shoulders 53 and 54 by means of the valve 16 to a governor outlet passage 58 in accordance with a pressure balance between the addition of the centrifugal force on the valve 16 and the pressure force from the passage 30 acting to urge the valve in an outwardly direction and the pressure force acting against the outward end of the land 50 tending to urge the valve 16 inwardly. Thus, the fluid pressure available at outlet 58 will be controlled in accordance with the operation of both of the valves 15 and 16.

The outlet pressure of the governor 10 is graphically illustrated in Fig. 3 along with graphic illustrations of the outlet pressures of the centrifugal valves alone, with outlet pressure being plotted against shaft rotational speed. The curve No. 1 illustrates the variation of the outlet pressure in passage 30 from the valve 15 with shaft rotational speed. This curve is a relatively steep one showing that the outlet pressure changes very rapidly with change in shaft R. P. M. until line pressure is reached at the point A beyond which the discharge pressure of the valve 15 remains constant as the shaft speed is further increased.

Curve No. 2 is a graphic illustration of the outlet pressure in passage 56 of the high speed governor valve 16 with the passage 30 exhausted so that the valve will operate as an ordinary centrifugal governor. It will be seen that due to the smaller mass of the valve 16 the centrifugal force and consequently the outlet pressure increases much more slowly with increase in shaft rotational speed. As a result, the rate of increase of outlet pressure in the low range is so small that it would not be usable for performing accurate control of a transmission.

Curve No. 3 graphically illustrates the outlet pressure at the port 58 of the governor 10 with both of the centrifugal valves operative. Due to the imposition of the discharge pressure from the valve 15 upon the piston portion of the valve 16 the low speed portion of the curve has a fairly steep slope lying generally midway between the slopes of the curves No. 1 and 2. Thus, the rate of increase of governor discharge pressure with increase in shaft rotational speed is sufficient for accurately controlling a transmission or the like during the low speed range of operation. At a point B the slope of curve No. 3 decreases since this is the point at which the discharge pressure from valve 15 reaches the line pressure. From this point on as the shaft speed increases the rate of increase of governor pressure is substantially smaller than the rate just before the point B but is ample for adequately controlling the transmission during the high speed range since, in this range, the speed of rotation of the shaft has become sufficient to induce a substantial increase in centrifugal force acting on the valve 16 with increase in shaft speed.

In order to further illustrate the beneficial coaction of the valves in the governor of the present invention a curve No. 4 is included showing the operational characteristics of a single valve type governor which at a given relatively high R. P. M. will provide the same governor discharge pressure as the governor 10. It will be noted that slope of this curve in the low range is not much greater than that of the low speed range valve 15 so that this governor would not be usable for accurate transmission control in this low range.

From the above description it will be readily apparent that the present invention provides a substantially improved centrifugal type fluid pressure governor with a very much increased useful operational range so that the governor outlet pressure can be used for controlling an automatic transmission over the entire ratio changing range. Hence, this invention has eliminated the need for two or more separate valves with consequent complication and increase in cost of production and maintenance. The governor is advantageously compact and completely automatic in operation over the entire operational range.

It will be understood that modifications and variations may be effected without departing from the scope of the novel concepts of the present invention.

I claim:

1. A centrifugal type fluid pressure governor comprising a first valve slidably disposed in a body portion rotatable about an axis whereby the valve tends to move outwardly under centrifugal force, a second valve slidably disposed in a second body portion rotatable in timed relationship with said first valve so that the valve tends to move outwardly under centrifugal force, means for supplying fluid under pressure to said valves, said valves including metering means for metering fluid pressure from said supply which changes in response to increased centrifugal force, means directing the output pressure of each of said valves against a portion of the valve to bias the same towards said axis and to balance the centrifugal force on the valve, and means directing the output pressure of one of said valves against a surface of the other valve to bias the other valve and change the output pressure response of said other valve.

2. A centrifugal type fluid pressure governor comprising a member rotatable about an axis, first and second valves in said member, means supplying fluid under pressure to said valves, said valves being responsive to centrifugal force to move away from said axis and including metering means for metering fluid pressure from said supply which changes in response to increased centrifugal force and directing metered fluid pressure against respective portions of the valves to urge the same toward said axis, and means directing metered fluid pressure from one of said valves against a surface of the other of said valves to change the total force on said other valve for changing the response of the latter.

3. A governor for controlling the rate of change of fluid pressure comprising a member rotatable about an axis, a pair of valves slidably disposed in said member eccentrically of said axis and movable outwardly in response to centrifugal force generated by rotation of said member, means introducing fluid under pressure against said valves when the same are moved outwardly whereby the fluid pressure biases the valves inwardly, means applying the biasing fluid pressure from one of said valves against a portion of the other valve to urge the same outwardly in addition to the centrifugal force acting on said other valve when the governor is rotated, whereby the biasing fluid pressure from said other valve is responsive to the operation of both of said valves.

4. In a governor, a member rotatable about an axis, a first valve slidably disposed in said member eccentrically of said axis whereby said valve moves outwardly of the axis in response to centrifugal force when said member is rotated, said member having a first inlet port and a first outlet port controlled by said first valve, a second valve slidably disposed in said member eccentrically of said axis whereby said second valve moves outwardly of the axis in response to centrifugal force when said member is rotated, said member having a second inlet port and a second outlet port controlled by said second valve, means supplying fluid under pressure to said inlet ports whereby said valves provide increased fluid pressure to said outlet ports in response to increased centrifugal force on the valves when said member is rotated, and means imposing the fluid pressure from said first valve outlet on a portion of said second valve to bias the same outwardly to increase the fluid pressure from said second outlet responsive to centrifugal force.

5. In a governor, a member rotatable about an axis, a first valve slidably disposed in said member eccentrically of said axis whereby said first valve moves outwardly of the axis in response to centrifugal force when said member is rotated, said member having a first inlet port and a first outlet port with said ports in communication when said valve is moved outwardly and out of communication when said valve is moved inwardly, a second valve slidably disposed in said member eccentrically of said axis whereby said second valve moves outwardly of the axis in response to centrifugal force when said member is rotated, said member having a second inlet port and a second outlet port with said ports in communication when said second valve is moved outwardly and out of communication when said second valve is moved inwardly, means supplying fluid under pressure to said inlet ports, said valves having surfaces in communication with the respective outlets whereby fluid pressure urges said valves inwardly in opposition to centrifugal force, and means imposing the fluid pressure from said first valve outlet upon a portion of said second valve to bias the same outwardly to increase the fluid pressure from said second valve outlet responsive to centrifugal force.

6. In a governor, a member rotatable about an axis, a first valve slidably disposed in said member eccentrically of said axis whereby said valve moves outwardly of the axis in response to centrifugal force when said member is rotated, said member having a first inlet port and a first outlet port with said ports in communication when said valve is moved outwardly and out of communication when said valve is moved inwardly, said valve having an enlarged portion with an outwardly directed surface thereof in comunication with said first outlet port, a second valve slidably disposed in said member eccentrically of said axis whereby said second valve moves outwardly of the axis in response to centrifugal force when said member is rotated, said member having a second inlet port and a second outlet port with said ports in communication when said second valve is moved outwardly and out of communication when said second valve is moved inwardly, said second valve having a pair of enlarged portions defining a groove therebetween in communication with said second outlet port, the outermost of said enlarged portions having an aperture therethrough putting the outward surface of said outermost portion in communication with said second outlet port, means supplying fluid under pressure to said inlet ports, and means imposing the fluid pressure from said first valve outlet upon a portion of said second valve to bias the same outwardly to increase the fluid pressure from said second valve outlet responsive to centrifugal force.

7. A centrifugal type fluid pressure governor comprising a member rotatable about an axis, first and second valves mounted in said member eccentrically of said axis and movable outwardly in response to centrifugal force when said member is rotated, said second valve having a lower mass-radius product when said member is rotated about said axis than said first valve, means supplying fluid under pressure to said valves, said valves having metering means for metering increased fluid pressure in response to increased centrifugal force and directing metered fluid pressure against respective portions of the valves to bias the same toward said axis, and means directing metered fluid pressure from said first valve against a surface of said second valve to augment the centrifugal force on the second valve.

8. A centrifugal type fluid pressure governor comprising a member rotatable about an axis, a first valve in said member including a weight mounted eccentrically of said axis and effective to move said valve outwardly in response to centrifugal force when said member is rotated, a second valve mounted in said member movable outwardly in response to centrifugal force when said member is rotated and having a lower mass-radius product about said axis than said first valve, means supplying fluid under pressure to said valves, said valves having metering means for metering increased fluid pressure in response to increased centrifugal force and directing metered pressure against respective portions of the valves to bias the same toward the axis, said second valve having an inwardly directed surface of smaller area than that acted on by the pressure metered by said second valve metering means, and means directing metered fluid pressure from said first valve against said second valve inwardly directed surface to increase the metered fluid pressure from said second valve responsive to centrifugal force.

9. A governor for controlling the rate of change of fluid pressure comprising a member rotatable about an axis, a first valve slidably disposed in said member eccentrically of said axis and movable outwardly in response to centrifugal force generated by rotation of said member, a second valve slidably disposed in said member eccentrically of said axis and movable outwardly in response to centrifugal force generated by rotation of said member, said second valve having a lower mass-radius product when said member is rotated about said axis than said first valve, means introducing fluid under pressure against said valves when the same are moved outwardly whereby the fluid pressure biases said valves inwardly, said second valve having an inwardly directed surface, means applying the biasing fluid pressure from said first valve against said second valve inwardly directed surface to urge said second valve outwardly in addition to the centrifugal force acting thereon, whereby the biasing fluid pressure from said second valve is responsive to the operation of both of said valves.

10. In a governor, a member rotatable about an axis, a first valve slidably disposed in said member eccentrically of said axis, a weight secured to said first valve eccentrically of said axis, whereby said valve moves outwardly of the axis in response to centrifugal force when said member is rotated, said member having a first inlet port and a first outlet port controlled by said first valve, a second valve slidably disposed in said member eccentrically of said axis whereby said second valve moves outwardly of the axis in response to centrifugal force when said member is rotated, said second valve having a lower mass-radius product than said first valve with said weight secured thereto when said member is rotated, said member having a second inlet port and a second outlet port controlled by said second valve, said valves having respective surfaces in communication with said outlet ports, means supplying fluid under pressure to said inlet ports whereby said valves meter increased fluid pressure to said surfaces and to said outlet ports in response to increased centrifugal force on the valves when said member is rotated, and means imposing the fluid pressure from said first valve outlet upon a portion of said second valve to bias the same outwardly to increase the fluid pressure from said second outlet responsive to centrifugal force.

11. In a governor, a member rotatable about an axis, a first valve slidably disposed in said member eccentrically of said axis whereby said first valve moves outwardly of the axis in response to centrifugal force when said member is rotated, said member having a first inlet port and a first outlet port with said ports in communication when said valve is moved outwardly and out of communication when said valve is moved inwardly, a second valve slidably disposed in said member and eccentrically of said axis whereby said second valve moves outwardly of the axis in response to centrifugal force when said member is rotated, said second valve having a lower mass-radius product about said axis than said first valve when said member is rotated, said member having a second inlet and a second outlet port with said ports in communication when said second valve is moved outwardly and out of communication when said second valve is moved inwardly, means supplying fluid under pressure to said inlet ports, said valves having surfaces in communication with the respective outlets whereby fluid pressure urges said valves inwardly in opposition to centrifugal force, said second valve having a second surface thereon with an area smaller than that of said first named surface on said second valve, and means imposing the fluid pressure from said first valve outlet upon said second valve second surface to bias the second valve outwardly to increase the fluid pressure from said second valve outlet responsive to centrifugal force.

12. In a governor, a member rotatable about an axis, a first valve slidably disposed in said member eccentrically of said axis, a weight secured to said first valve eccentrically of said axis, whereby said first valve moves outwardly of the axis in response to centrifugal force on the valve and the weight when said member is rotated, said member having a first inlet port and a first outlet port with said ports in communication when said valve is moved outwardly and out of communication when said valve is moved inwardly, said valve having an enlarged portion with an outwardly directed surface thereof in communication with said first outlet port, a second valve slidably disposed in said member eccentrically of said axis whereby said second valve moves outwardly of the axis in response to centrifugal force when said member is rotated, said second valve having a lower mass-radius product about said axis than said first valve and said weight when said member is rotated, said member having a second inlet port and a second outlet port with said ports in communication when said second valve is moved outwardly and out of communication when said second valve is moved inwardly, said second valve having a pair of enlarged portions defining a groove therebetween in communication with said second outlet port, the outermost of said enlarged portions having an aperture therethrough putting the outward surface of said outermost portion in communication with said second outlet port, said second valve having an additional inwardly directed surface of smaller area than the outward surface of said outermost portion, means supplying fluid under pressure to said inlet ports, and means imposing the fluid pressure from said first valve outlet upon said second surface of said second valve to bias the same outwardly to increase the fluid pressure from said second outlet responsive to centrifugal force.

13. In a governor, a member rotatable about an axis, a control part arranged for rotation with said member and adapted to move outwardly of said axis in response to centrifugal force when said member is rotated, means for variably counteracting the centrifugal force on said control part so that the response of the control part varies with the speed of said member, a source of fluid pressure, a pressure control valve for metering pressure from said source arranged for rotation with said member and adapted to move radially outwardly of said axis in response to centrifugal force when said member is rotated and having its metered pressure directed against a surface of the valve to oppose the action of centrifugal force on the valve whereby the pressure metered by the valve varies with changes in centrifugal force, and means for directing the metered pressure from said valve against said control part to modify the centrifugally induced response of the control part.

14. In a governor, a rotatable member, a control part arranged for rotation in timed relationship with said member and adapted to move outwardly in response to centrifugal force when said member is rotated, means for variably counteracting the centrifugal force on said control part so that the response of the control part varies with the speed of said member, a second control part arranged for rotation in timed relationship with said member and adapted to move outwardly in response to centrifugal force when said member is rotated, means for variably counteracting the centrifugal force on said second control part so that the response of said second control part varies with the speed of said member, and means for connecting said second control part with said first named control part so that the centrifugal response of said second control part is impressed on said first named control part for modifying the centrifugal response of said first named control part.

15. In a governor, a member rotatable about an axis, a control part arranged for rotation with said member and radially movably disposed with respect to the member whereby the part tends to move radially outwardly under centrifugal force when the member is rotated and providing an output force that varies with the speed of rotation of said member and which is applied to said control part to counteract the centrifugal force on the control part, a source of fluid pressure, a pressure control valve for metering pressure from said source arranged for rotation with said member and adapted to move radially outwardly of said axis in response to said centrifugal force when said member is rotated and having its metered pressure directed against a surface of the valve to oppose the action of centrifugal force on the valve whereby the pressure metered by the valve varies with changes in centrifugal force, and means for directing the metered pressure from said valve against said control part to modify the centrifugally induced output force of the control part.

References Cited in the file of this patent

UNITED STATES PATENTS

| | | |
|---|---|---|
| 2,163,203 | Kegresse | June 20, 1939 |
| 2,503,362 | Sweet | Apr. 11, 1950 |
| 2,545,684 | Carson et al. | Mar. 20, 1951 |
| 2,602,655 | Gesner | July 8, 1952 |